Sept. 9, 1969     A. MICHELSON     3,465,610
DUAL SPEED DRIVE
Filed Sept. 29, 1967     2 Sheets-Sheet 1
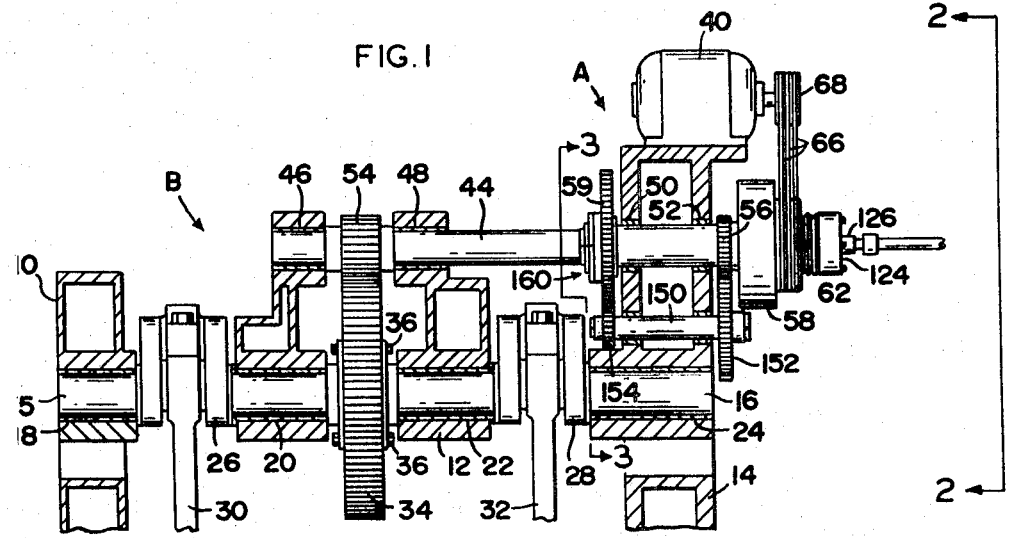
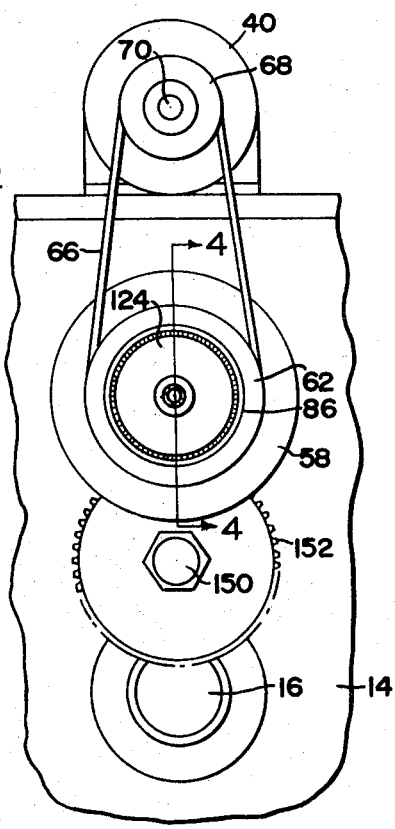
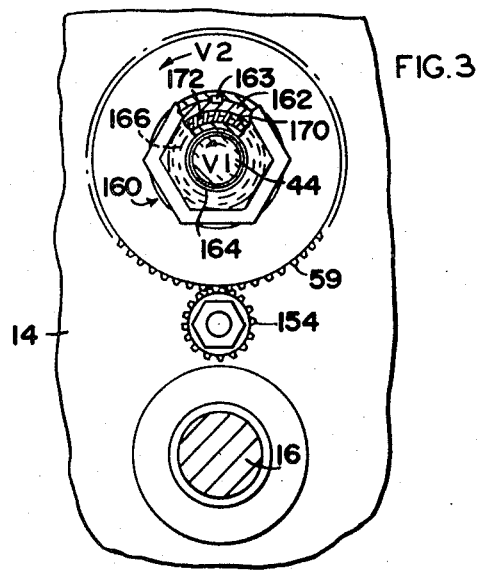
INVENTOR.
ANATOL MICHELSON
BY
Meyer, Tilberry & Body
ATTORNEYS.

Sept. 9, 1969      A. MICHELSON      3,465,610
DUAL SPEED DRIVE
Filed Sept. 29, 1967      2 Sheets-Sheet 2
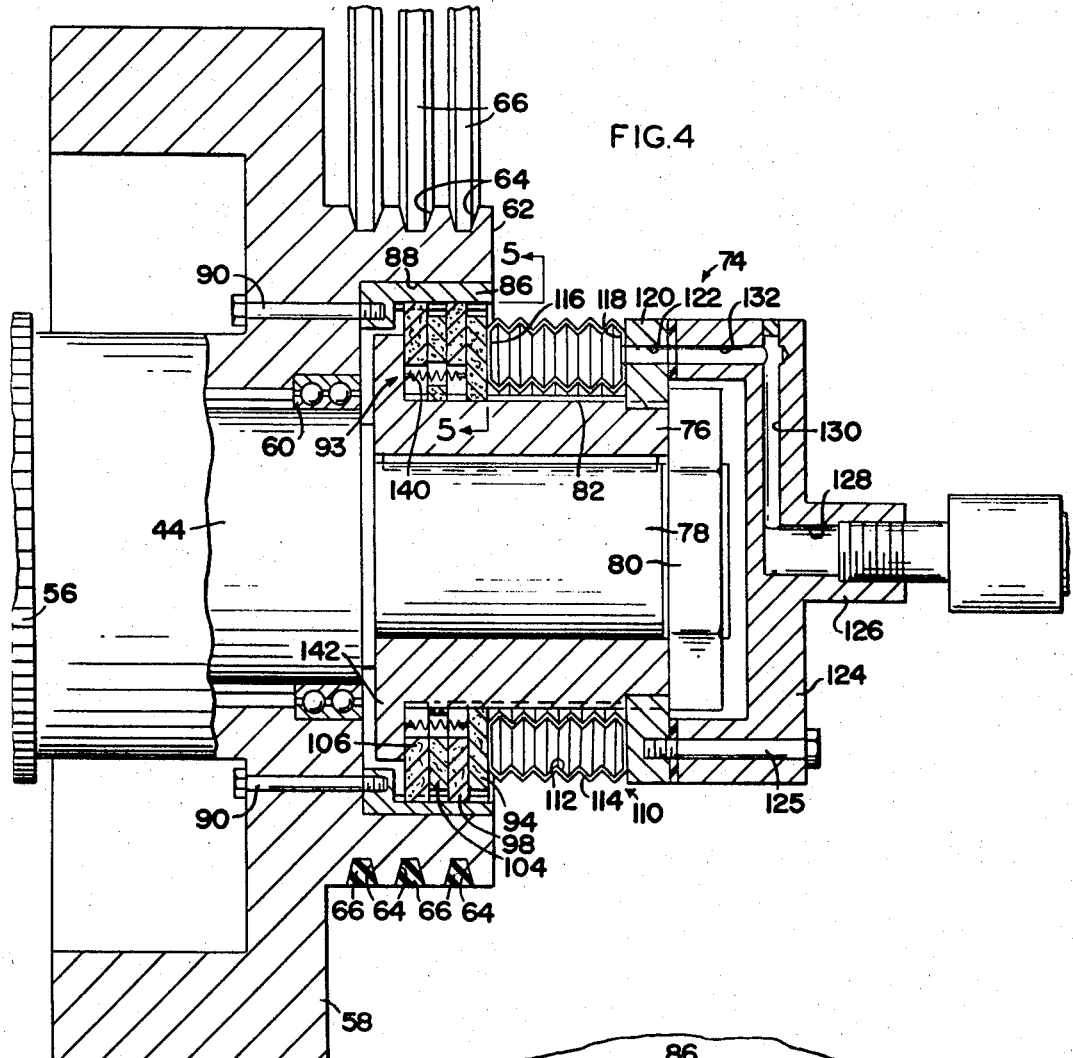
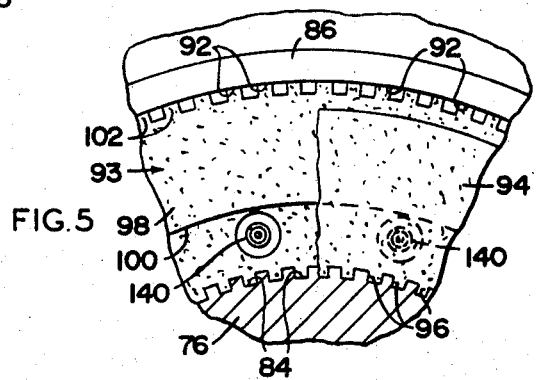
INVENTOR.
ANATOL MICHELSON
BY
*Meyer, Tilberry & Body*
ATTORNEYS.

३,४६५,६१०
DUAL SPEED DRIVE
Anatol Michelson, Glenolden, Pa., assignor to E. W. Bliss
Company, Canton, Ohio, a corporation of Delaware
Filed Sept. 29, 1967, Ser. No. 671,855
Int. Cl. F16h 3/10; F16d 47/04, 41/04
U.S. Cl. 74—368                                      1 Claim

ABSTRACT OF THE DISCLOSURE

An improved two-speed power transmission especially suited for use in power presses. The transmission includes first and second driven gears; connecting means continuously interconnecting the gears so that they rotate at velocities V1 and V2, respectively; a driven shaft; a first clutch means selectively engageable for drivingly connecting the first gear to the shaft to cause the shaft to rotate at a velocity V3; and, means including an overrunning clutch for interconnecting the second gear and the shaft for rotating the shaft at a velocity V4 when the first clutch means is disengaged. In the preferred embodiment the transmission is arranged so that V1 equals V3, and V2 equals V4.

---

The present invention is directed toward the art of power transmissions and, more particularly, to a transmission of the dual speed type.

The invention is particularly suited for use in driving power presses and will be described with particular reference thereto; however, it is appreciated the invention is capable of broader application and could be used wherever a two-speed drive is required.

In the press art, it is desirable, in certain types of presses or press operations, that the press ram or slide be driven at variable speeds during a press cycle (i.e. one complete opening and closing of the press). Additionally, it is often desirable that the drive speed of the press be capable of being varied so that one series of continuous cycles can be performed at a speed different from that of a second series of continuous cycles.

In the past, variable speed operation was generally provided by complicated transmissions having multiple friction clutches or single clutches with multiple actuators. The complexity of these arrangements made it difficult to make repairs because substantial disassembly of the press was sometimes required to gain access to some of the clutch arrangements. Further, their general unreliability resulted in frequent press down time and, consequently, loss in production.

Because of the many problems attendant to these prior dual speed transmissions, the advantageous features of dual speed press operation were often sacrificed for the greater reliability and simplicity provided by single speed transmissions.

The present invention provides a dual speed transmission which is highly simplified in construction, yet is well suited for use in presses. Because of the simplicity and arrangement of the transmission maintenance and repair can be performed quickly and easily.

In accordance with the present invention there is provided an improved two-speed power transmisison especially suited for use in power presses. The transmission includes first and second driven gears; connecting means continuously interconnecting the gears so that they rotate at velocities V1 and V2, respectively; a driven shaft; a first clutch means selectively engageable for drivingly connecting the first gear to the shaft to cause the shaft to rotate at a velocity V3; and, means including an overrunning clutch for interconnecting the second gear and the shaft for rotating the shaft at a velocity V4 when the first clutch means is disengaged.

Because of the arrangement of the overrunning clutch, speed change can be effected merely by the engagement and disengagement of a single friction clutch without the need of any auxiliary gear changing mechanism or additional friction clutches. Because dual speed operation is possible with only a single clutch which must be controlled, the transmission is especially suited for use in power presses. Simply by controlling the one friction clutch in response to the position of the press drive shaft the necessary speed changes can be effected. Additionally, since there is only one friction clutch it is a simple matter to arrange the drive on the press so that the clutch is readily accessible for maintenance and repair. In this manner, the problems attendant to prior dual speed transmission arrangements are overcome.

Accordingly, a primary object of the present invention is the provision of a dual speed transmission which is highly simplified and reliable in operation.

Another object is the provision of a dual speed transmission which is especially suited for use in power presses.

Another object is the provision of a transmission wherein speed change is effected simultaneously with the engagement and disengagement of a single friction clutch.

A still further object of the present invention is the provision of a dual speed transmission wherein an overrunning clutch allows speed changes to be effected by the use of a single friction clutch without the use of gear changing mechanism.

These and other objects and advantages will become apparent from the following description used to illustrate a preferred embodiment of the present invention when read in conjunction with the accompanying drawings wherein:

FIGURE 1 is a cross-section through the crown of a press provided with an improved dual speed transmission constructed in accordance with a preferred embodiment of the present invention;

FIGURE 2 is a view taken on line 2—2 of FIGURE 1;

FIGURE 3 is a cross-sectional view taken on line 3—3 of FIGURE 1 with portions broken away to show the internal arrangement of the overrunning clutch;

FIGURE 4 is an enlarged cross-sectional view taken on line 4—4 of FIGURE 2; and, FIGURE 5 is a cross-sectional view taken on line 5—5 of FIGURE 4.

Referring now to the drawings wherein the showings are for the purpose of illustrating a preferred embodiment of the invention only and not for the purpose of limiting same, FIGURE 1 shows the improved dual speed transmission A of the present invention utilized on a conventional metal working press B.

As shown in FIGURE 1, numerals 10, 12 and 14 indicate the crown portions of a conventional double crank press of the type utilized in performing stamping and forming operations. The actual construction and arrangement of the press frame could be of a variety of types and configuration; however, as shown and described herein it is a conventional cast frame including vertical uprights and a horizontally extending crown connected thereto by vertically extending tie bolts (not shown).

A crank or drive shaft extends horizontally through the crown and is formed from two sections 15 and 16 supported for rotation in suitable bearings 18, 20, 22 and 24, respectively. Sections 15 and 16 each include a crank portion 26 and 28, respectively, which carry connecting rods 30 and 32 that are connected at their lower ends to the press ram or slide (not shown). The bearing portions 18, 20, 22 and 24 may be provided with removable bearings caps in any conventional manner not important to the present invention. A bull gear or crankshaft drive gear 34 is mounted centrally between bearings 20 and 22 and is positively connected to the crank sections 15 and 16 by flanges and bolts 36.

The crankshaft is driven from a conventional electric motor 40 through transmission A. As previously discussed, the transmission is arranged so as to be capable of driving the crankshaft at variable speeds during one revolution, or of continuously driving it at either of two selective speeds.

As shown, according to the preferred embodiment, the improved transmission includes a horizontally extending driven shaft 44 which is mounted for rotation in suitable bearings 46, 48, 50 and 52 carried in the press crown structure. A pinion gear 54 is keyed or otherwise positively connected to shaft 44 and mounted between bearings 46 and 48 in engagement with bull gear 34.

The improved means for rotating shaft 44 at either of two selected speed includes first and second gears 56 and 59, respectively. As best shown in FIGURE 4, the first gear 56 is arranged to be freely rotatable relative to shaft 44. As shown in the preferred embodiment, gear 56 is formed as an integral part of a flywheel 58. Flywheel 58 is mounted on the outer end portion of shaft 44 by a pair of longitudinally spaced bearings 60. As shown, the right-hand end 62 of flywheel 58 is of reduced diameter and has three belt receiving grooves 64 formed in its outer surface. V-belts 66 are received in grooves 64 and pass over drive pulley 68 which is positively connected to the output shaft 70 of a conventional electric motor 40. Consequently, rotation of motor 40 causes flywheel 58 and gear 56 to be rotated relative to shaft 44.

The means to positively connect flywheel 58 to driven shaft 44 to drive the press at a first speed include a specially designed clutch assembly indicated generally by the reference number 74. As best seen in FIGURE 4, the clutch includes a first member 76 which is keyed to a reduced end portion 78 of shaft 44. Member 76 is maintained on end portion 78 by a nut 80 threaded to the end of the shaft. The outer circumference 82 of member 76 is provided with a plurality of longitudinally extending grooves 84 circumferentially spaced about the member. A second portion of the clutch is formed by a member 86 which is mounted in a recess opening 88 formed axially inwardly from the outer or right-hand end of flywheel 58. Member 86 is non-rotatably connected in recess 88 by a plurality of screws 90 which extend through openings formed in the flywheel into threaded engagement with member 86. A plurality of axially extending grooves 92 are formed inwardly of the inner periphery of member 86 and are equally spaced circumferentially thereof.

The means provided to provide a positive connection between members 86 and 88 include a plurality of annular disc members indicated generally by the reference numeral 92. These members are formed as best shown in FIGURE 5. The outermost disc 94 has an inner periphery provided with inwardly extending tab portions 96 which are arranged to be slideably received in grooves 84 of member 76. The next adjacent disc member 98 has an inner periphery of a diameter substantially larger than the maximum diameter of the grooved portion of member 76. The outer periphery of member 98 is formed with outwardly extending tab portions 102 arranged to be slideably received in the grooves 92, of member 86. The next two disc members 104 and 106 are constructed substantially the same as disc members 94 and 98, respectively (i.e. disc member 104 has its inner periphery arranged to be received within the longitudinally extending grooves 82 while disc 106 has its outer periphery arranged to be received in grooves 92 of member 86). The disc members could be formed from a variety of materials; however, preferably they are formed from steel.

As is apparent, by applying an axially directed force inwardly against the discs, the discs are driven together and frictionally engaged to transmit power from the flywheel to the shaft 44 to produce rotation of the shaft at the speed of the flywheel. The means provided to produce the necessary axial force could take a variety of forms; however, as shown, these means include an annular shaped bellows unit 110. As shown, the bellows unit includes an inner bellows 112 and an outer bellows 114 which are sealed at their left-hand end by a wall 116 which is connected with disc 94. The opposite ends of the bellows are joined by an end wall 118 to provide a sealed fluid chamber. By supplying fluid to the chamber the bellows unit is expanded and a force directed against the discs to frictionally engage them. As shown, the bellows unit is maintained on the end of member 76 by a flange 120 which is keyed to the end of the shaft and maintained thereon by nut 80. A fluid opening 122 extends through member 120 into communication with the inner chamber of the bellows unit. Although only one flow passage 122 is shown, it is apparent that any number of such passages could be provided.

Fluid supply to passage 122 is provided through an end cap 124 connected to member 120 by a plurality of screws 125. A conventional swivel connection is threadably received in the outer end of boss 126 and is communicated with line or flow passage 122 by lines 128, 130 and 132 formed in the end cap. As is apparent, by supplying fluid through the swivel connection the bellows unit 110 will be expanded causing the disc members to be engaged to provide a positive drive connection between the flywheel and the shaft to produce rotation of the shaft.

Means are provided to move the discs apart and bias the bellows unit 110 to the right when the fluid pressure is relieved in the bellows chamber. These means comprise a plurality of springs 140 extending between the inner collar 142 of member 76 and the outermost disc 94. Any convenient means could be used to properly maintain the springs in position; however, as shown, the springs are preferably received on short pins which extend inwardly from the collar 77 and the outer disc 98, respectively.

The above arrangement permits the drive shaft 44 and, consequently, the press A to be driven at a first fixed speed. In order to provide a second speed for the press the first gear 56 and the second gear 59 are drivingly interconnected through a drive train which includes a horizontally extending shaft 150 mounted for rotation about an axis parallel with shaft 44. As shown, a first gear 152 is keyed or otherwise positively connected to the right-hand end of the shaft 150. Gear 152 is in driving engagement with first gear 56. A gear 154 is similarly connected to the inner end of shaft 150 and is in engagement with gear 59. Consequently, rotation of flywheel 58 and gear 56 causes gear 59 to be continuously rotated at a velocity less than the velocity at which the flywheel and gear 56 are rotating.

Of particular importance to the present invention is the arrangement provided for drivingly connecting gear 59 to shaft 44. As best shown in FIGURE 3 this means includes a conventional overrunning clutch unit 160. The overrunning clutch unit 160 is arranged so that as long as shaft 44 is rotating at a velocity V1 which is greater than the velocity V2 of gear 59, no driving connection will be effected between shaft 44 and gear 59. However, whenever the velocity V1 of shaft 44 drops below velocity V2 of gear 59, the overrunning clutch automatically engages, causing shaft 44 to be driven through gear 59.

Any of a variety of types of overrunning clutches could be utilized to effect the automatic connection between shaft 44 and gear 58. As shown in FIGURE 3 however, the clutch unit 160 is preferably of the conventional cam type. This clutch includes an outer housing member 162 which is keyed, as shown at 163 to the inner periphery of gear 58 for simultaneous rotation therewith. A second inner portion 164 is connected to the outer surface of shaft 44. Members 162 and 164 are arranged so as to define an annular chamber 166 therebetween. Conventional roller or ball bearings (not shown) are mounted in chamber 166 and serve to support the outer clutch portion 162 and the gear 59 from the inner clutch portion 164. Positioned between the bearings are a plurality of cam members 170. These cam members are carried on an annular ring 172 which passes through the center of each of the cam members and includes means for maintaining them circumferentially spaced thereon while permitting them to be free to have a slight amount of oscillation.

As is apparent from FIGURE 3 with shaft 44 rotating at a velocity V1 greater than the velocity V2 the cam member 170 will tend to oscillate in a clockwise direction to prevent any transfer of motion from shaft 44 to gear 59; however, when velocity V1 drops below velocity V2 the cam members 170 will oscillate or rotate slightly in a counterclockwise direction to engage members 162 and 166 to provide a positive drive connection between the gear and the shaft to thus cause the shaft to rotate at velocity V2.

As can be seen, the operation of the described transmission is extremely simple. When it is desired to drive the press at the maximum speed, the clutch 74 is engaged to make a positive drive connection between the flywheel 58 and the shaft 44. Because at this time the velocity V1 of the shaft is greater than the velocity V2 of gear 59 the overrunning clutch 160 is in the overrunning condition and relative rotation can take place between gear 58 and shaft 44. When it is desired to drive the press at a lower speed, clutch 74 is disengaged. Drive shaft 44 immediately slows down until it reaches the velocity V2 at which the gear 59 is continuously driven. At this time the overrunning clutch 160 engages and power is transmitted through the parallel shaft 150 to the driven shaft 44.

As is apparent from the aforegoing description, the improved two speed drive assembly of the invention is relatively simple in construction. Because of this simplicity the various elements of the system can be mounted so as to permit them to be readily accessible for maintenance. Additionally, since the present system has only one clutch which must be actuated by a fluid system, the control of the transmission is greatly simplified.

The invention has been described in great detail sufficient to enable one of ordinary skill in the transmission arts to make and use the same. Obviously, modifications and alterations of the preferred embodiment will occur to others upon a reading and understanding of this specification and it is my intention to include all such modifications and alterations as part of my invention insofar as they come within the scope of the appended claims.

Having thus described my invention, I claim:

1. A two speed power transmission including: a first shaft; first and second gears carried on said shaft; said first gear being freely rotatable relative to said shaft; means for continuously rotating said first gear at a constant velocity V1; a gear train continuously interconnecting said first and second gears so that said second gear rotates at a constant velocity V2, with velocity V1 being greater than velocity V2; a friction clutch for selectively connecting said first gear to said shaft at any desired time without regard to the velocity of said first gear to drive said shaft at velocity V1; and, an overrunning clutch positioned between said second gear and said shaft for connecting said second gear to said shaft when said friction clutch is disengaged to thereby cause said shaft to rotate at velocity V2.

References Cited
UNITED STATES PATENTS

| | | | |
|---|---|---|---|
| 2,172,991 | 9/1939 | Segard | 74—368 |
| 2,496,937 | 2/1950 | Edwards | 74—368 |
| 3,306,122 | 2/1967 | Dean | 192—4 |

ARTHUR T. McKEON, Primary Examiner

U.S. Cl. X.R.

192—48.6, 48.92